(12) United States Patent
Schmitz et al.

(10) Patent No.: US 12,398,762 B2
(45) Date of Patent: Aug. 26, 2025

(54) CONSTANT VELOCITY JOINT

(71) Applicant: AKTIEBOLAGET SKF, Gothenburg (SE)

(72) Inventors: Tom Schmitz, Hambach (DE); Klaus Dietmar Rippstein, Ebelsbach (DE); Lisa Baierl, Schweinfurt (DE); Ingo Schulz, Gerolzhofen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 425 days.

(21) Appl. No.: 17/866,781

(22) Filed: Jul. 18, 2022

(65) Prior Publication Data

US 2023/0039622 A1 Feb. 9, 2023

(30) Foreign Application Priority Data

Aug. 5, 2021 (DE) .......................... 102021208526.1

(51) Int. Cl.
*F16D 3/224* (2011.01)
*F16D 3/2245* (2011.01)
*F16D 3/223* (2011.01)

(52) U.S. Cl.
CPC .. *F16D 3/2245* (2013.01); *F16D 2003/22303* (2013.01); *F16D 2003/22309* (2013.01); *F16D 3/224* (2013.01); *Y10S 464/906* (2013.01)

(58) Field of Classification Search
CPC .................... F16D 3/2245; F16D 3/224; F16D 2003/22303; F16D 2003/22309; Y10S 464/906

USPC .......................................... 464/145
See application file for complete search history.

(56) References Cited

U.S. PATENT DOCUMENTS

| | | | |
|---|---|---|---|
| 2,838,919 A * | 6/1958 | Cull .................. | F16D 3/2245 464/145 |
| 6,383,082 B1 * | 5/2002 | Declas ............... | F16D 3/2245 464/145 |

FOREIGN PATENT DOCUMENTS

JP              3-172621 A  *  7/1991  ................... 464/144

* cited by examiner

*Primary Examiner* — Greg Binda
(74) *Attorney, Agent, or Firm* — J-TEK LAW PLLC; Scott T. Wakeman; Mark A. Ussai

(57) ABSTRACT

A constant velocity joint includes an outer part having a connecting portion and an opening portion and a plurality of axial grooves forming outer raceways, and an inner part having a plurality of axial grooves forming inner raceways. Each outer raceway and inner raceway form a raceway pair, a ball being disposed in each raceway pair. Each raceway pair defines a region in axial cross-section with respect to a groove longitudinal axis conceptually divided into four quadrants. The outer raceway is in the first and second quadrants and the inner raceway is in the third and fourth quadrants. With torque transmission in a first direction, the ball has two contact points in the first quadrant and/or two contact points in the third quadrant, and with torque transmission in a second direction, the ball has two contact points in the second quadrant and/or two contact points in the fourth quadrant.

9 Claims, 2 Drawing Sheets

CONSTANT VELOCITY JOINT

CROSS-REFERENCE

This application claims priority to German patent application no. 102021208526.1 filed on Aug. 5, 2021, the entire contents of which are fully incorporated herein by reference.

BACKGROUND OF THE INVENTION

The present invention relates to mechanical joints, and more particularly to constant velocity joints.

Constant velocity joints, also called homokinetic joints, are used in order to enable a force transmission or torque transmission from a first shaft to a second shaft. The first shaft and the second shaft may be attached to each other at an angle. Such constant velocity joints typically include a joint outer part and a joint inner part including torque-transmitting balls disposed therebetween. The joint outer part has outer ball raceways, extending axially in a groove-shaped manner, that interact with inner ball raceways, extending axially in a groove-shaped manner, of the joint inner part, so that the balls are each guided in a pair of outer and inner ball raceways.

In the known constant velocity joints, seen in axial cross-section with respect to the longitudinal axis of the grooves, each ball has a single contact point with the outer ball raceway and a single contact point with the inner ball raceway. Due to these single contact points, the pressure exerted by the ball onto the respective ball raceway is very high, which can lead to high loading on, and therefore possibly early wear of, each ball raceway.

SUMMARY OF THE INVENTION

It is therefore the object of the present invention to provide a constant velocity joint that has an improved wear behavior and thus an increased service life.

A proposed constant velocity joint includes a joint outer part having a connecting side, an opening side, and a plurality of axially extending grooves that form outer ball raceways, and a joint inner part including a plurality of axially extending grooves that form inner ball raceways. Each individual outer ball raceway and inner ball raceway form a raceway pair, wherein a ball is respectively disposed in each raceway pair.

The balls serve for force and torque transmission between the joint outer part and the joint inner part. In this way, the torque of a shaft that is connected to the joint outer part can be transmitted to a shaft that is connected to the joint inner part. Due to the axially extending ball raceways, the two joint parts can additionally be tilted against or with respect to each other. Such a tilting leads to a movement of the balls in the ball raceways.

As discussed in the Background, with conventional constant velocity joints, the balls contact each ball raceway at a single contact point, which leads to a high contact pressure on each of the two contact points. In comparison thereto, in order to now achieve a better distribution of the contact pressure and thus a lower load of the ball raceways, the ball raceways of the present constant velocity joint are configured such that two contact points are active for each ball raceway of the joint inner part and/or of the joint outer part. This means that, with the present design, each one of the inner joint part or the outer joint part has two contact points with each ball. Under such design conditions, four contact points are ideally active, two per each ball raceway. Depending on the bend angle of the constant velocity joint, more contact points can also be active, for example, four per ball raceway.

In each case, a better contact-pressure distribution is achieved, since at least two contact points are active for each one of the ball raceways. In order to achieve this contact-pressure distribution, the outer ball raceway and the inner ball raceway of a raceway pair define a region that, in cross-section with respect to the longitudinal axis of the grooves, is conceptually divided into four quadrants, wherein the outer ball raceway is disposed in the first and second quadrants, and the inner ball raceway is disposed in the third and fourth quadrants. With a torque transmission of the constant velocity joint in a first direction, the ball has two contact points in the first quadrant and/or two contact points in the third quadrant. With a torque transmission of the constant velocity joint in a second direction, the ball has two contact points in the second quadrant and/or two contact points in the fourth quadrant.

Specifically due to the ideal or preferred four contact points, the contact between the balls and the joint inner part and/or the joint outer part presumably worsens, for example, due to a higher proportion of sliding. However, this expected worsening is more than compensated for by the reduction of the contact pressure, so that a more advantageous contact situation is established. The special design of the constant velocity joint, wherein under the design conditions at least one of the joint parts (inner or outer) has two contact points with the ball, leads to a reduced load and thus to less wear, less surface damage, lower maximum contact pressure, longer service life, lower friction between ball and joint part, lower weight, and furthermore offers the possibility for downsizing or shrinking.

The two contact points per ball raceway can preferably be achieved by the outer ball raceway having, in the first quadrant, a first and a second radius of curvature whose center points are offset with respect to each other, and/or having, in the second quadrant, a third and a fourth radius of curvature whose center points are offset with respect to each other. The curvature of the ball raceway preferably changes both in the first quadrant and in the second quadrant. However, it is also possible that the curvature changes only in one of the quadrants, and the curvature experiences no change in the other quadrant. Such a change of the curvature, due to the two radii of curvature having different center points, causes the ball to contact the ball raceway in the corresponding quadrant at two contact points. Depending on the direction of the torque transmission, the ball preferably has two contact points in the first or in the second quadrant.

In an analogous manner, the inner ball raceway can have, in the third quadrant, a first and a second radius of curvature whose center points are offset with respect to each other, and/or, in the fourth quadrant, a third and a fourth radius of curvature whose center points are offset with respect to each other. It can thus be achieved that the curvature of the inner ball raceway changes both in the third quadrant and in the fourth quadrant. It is also possible here that the curvature changes only in one of the quadrants, and the curvature in the other quadrant experiences no change. This change of the curvature, due to the two radii of curvature having different center points, causes the ball to also contact the inner ball raceway in the respective quadrant preferably at two contact points (depending on the direction of the torque transmission, in the third or in the fourth quadrant).

According to a further embodiment, the outer and/or the inner ball raceway are configured such that the first and the second radius of curvature are configured such that one of the two contact points lies in the region of the first radius of curvature, and the other of the two contact points lies in the region of the second radius of curvature. Additionally or alternatively, the third and the fourth radius of curvature are configured such that one of the two contact points lies in the region of the third radius of curvature, and the other of the two contact points lies in the region of the fourth radius of curvature.

Due to these preferably two radii of curvature per quadrant and their specific arrangement, it can be insured that under the design conditions the ball has four contact points with the ball raceways. The radii of curvature of the ball raceways can be different or identical.

According to a further embodiment, the radii of curvature are identical. This leads to a symmetric separation of the radii of curvature and their center points on the four quadrants. Due to this symmetric arrangement, the load is uniformly distributed on the four contact points between the balls and the ball raceways.

According to a further embodiment, the contact points are disposed in a range of ±10°, preferably ±5°, about the transition between the first and the second radius of curvature and/or about the transition between the third and the fourth radius of curvature. The contact points between the ball and the ball raceways can vary within this region depending on the use case.

The contact points can be disposed symmetrically about an axis that is defined between the center point of the ball and the transition between the first and the second radius of curvature, and or about the transition between the third and the fourth radius of curvature. Alternatively the contact points can also be disposed asymmetrically about this axis, for example, +10° and −5° or +5° and −10°.

This applies respectively for the outer and the inner ball raceway, wherein the radii of curvature and angles of the outer ball raceway can differ or can be identical.

According to a further embodiment, in the first quadrant the outer ball raceway is divided by the first and the second radius of curvature into two identical parts, and/or in the second quadrant by the third and the fourth radius of curvature into two identical parts.

In an analogous manner, in the third quadrant the inner ball raceway can be divided by the first and the second radius of curvature into two identical parts, and/or in the fourth quadrant by the third and the fourth radius of curvature into two identical parts.

This uniform separation of the ball raceways also contributes to a uniform distribution of the contact points. In this way the contact pressure can be uniformly divided, and the contact stresses, and thus the wear, the friction, and other surface damage can thereby be reduced.

Alternatively it is also possible that the ball raceways are not divided into identical parts by the radii of curvature in the respective quadrants. Furthermore, the separation from quadrant to quadrant can be different.

Further advantages and advantageous embodiments are specified in the description, the drawings, and the claims. Here in particular the combinations of features specified in the description and in the drawings are purely exemplary, so that the features can also be present individually or combined in other ways.

BRIEF DESCRIPTION OF THE SEVERAL VIEWS OF THE DRAWING

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims. In the drawings:

DETAILED DESCRIPTION OF THE INVENTION

In the following, identical or functionally equivalent elements are designated by the same reference numbers.

Figure 1:
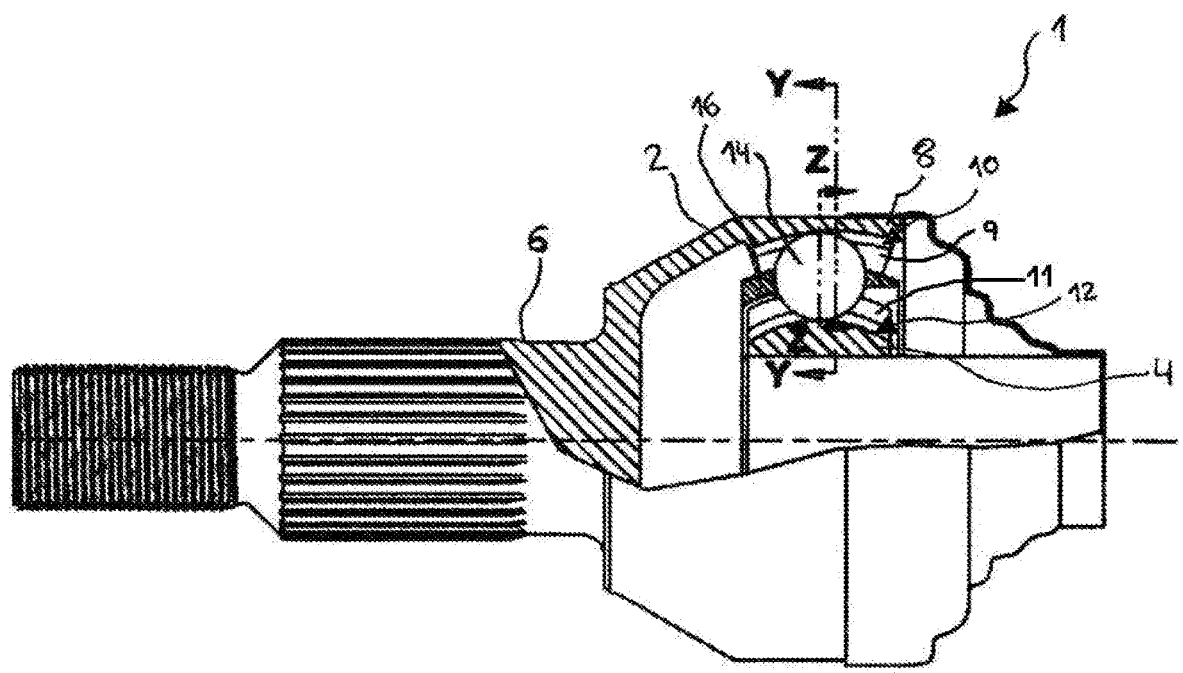
FIG. 1 shows a sectional view of a constant velocity joint.

FIG. 1 shows a constant velocity joint 1 including a joint outer part 2 and a joint inner part 4. The joint outer part 2 can be connected by a connecting side or portion 6 to a first shaft (not shown). An opening side or portion 8 of the joint outer part 2 surrounds the joint inner part 4. The joint inner part 4 can be connected to a second shaft (not shown).

Figure 2:
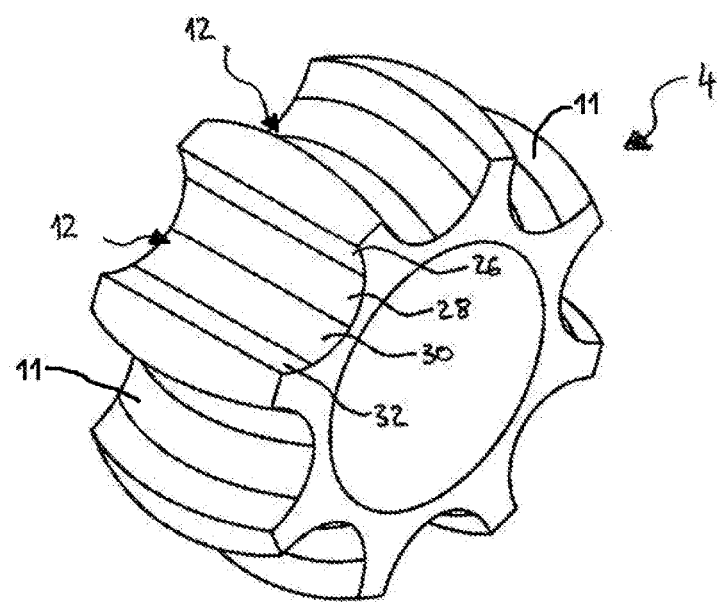
FIG. 2 shows a perspective view of the joint inner part of FIG. 1.

The joint outer part 2 includes a plurality of axially extending grooves 9 that each form one of a plurality of outer ball raceways 10, the grooves 9 preferably being formed in the opening portion 8. The joint inner part 4 also includes a plurality of axially extending grooves 11 that each form one of a plurality of inner ball raceways 12. As is shown in FIG. 2, the joint inner part 4 is preferably formed as a generally star-shaped ring including the plurality of axially extending grooves 11.

In order to make possible a force and torque transmission between the joint outer part 2 and the joint inner part 4, balls 14 are provided that can be guided by a cage 16. Each outer ball raceway 10 and a separate one inner ball raceways 12 form a raceway pair, wherein a ball 14 is respectively disposed in each raceway pair.

A torque of the joint outer part 2 is transmitted by the balls 14 to the joint inner part 4. In this way the torque of a shaft that is connected to the joint outer part 2 can be transmitted to a shaft that is connected to the joint inner part 4. Due to the axially extending grooves 9, 11 providing the ball raceways 10, 12, the two joint parts 2, 4 can additionally be tilted relative to each other. Such a tilting leads to a movement of the balls 14 in the ball raceways 10, 12.

In conventional constant velocity joints, the balls 14 each contact the ball raceways 10, 12 in one contact point on each raceway 10, 12. In comparison thereto, in order to achieve a better distribution of the contact pressure and thus lower loading on the ball raceways 10, 12, the ball raceways 10, 12 of the present constant velocity joint 1 are configured such that with a torque transmission of the constant velocity joint 1 in a first direction (i.e., a first angular direction), each ball 14 contacts the associated outer ball raceway 10 in two contact points P-1, P-2 (see FIG. 3), and/or the associated inner ball raceway 12 also in two contact points P-5, P-6 (see FIG. 4). With a torque transmission of the constant velocity joint 1 in a second direction (i.e., a second angular direction opposing the first direction), each ball 14 can contact the associated outer ball raceway 10 in two contact points P-3, P-4, and/or the associated inner ball raceway 12 also in two contact points P-7, P-8. Under these design conditions, the ball 14 preferably contacts the inner ball raceway 10 and the outer ball raceway 12 in four contact points overall, that is, a total of four contact points P-1/P-2/P-5/P-6 or P-3/P-4/P-

7/P-8. However, depending on the tilting of the joint parts 2, 4, each ball 14 can contact the ball raceways 10, 12 in more or fewer contact points.

Figure 3:
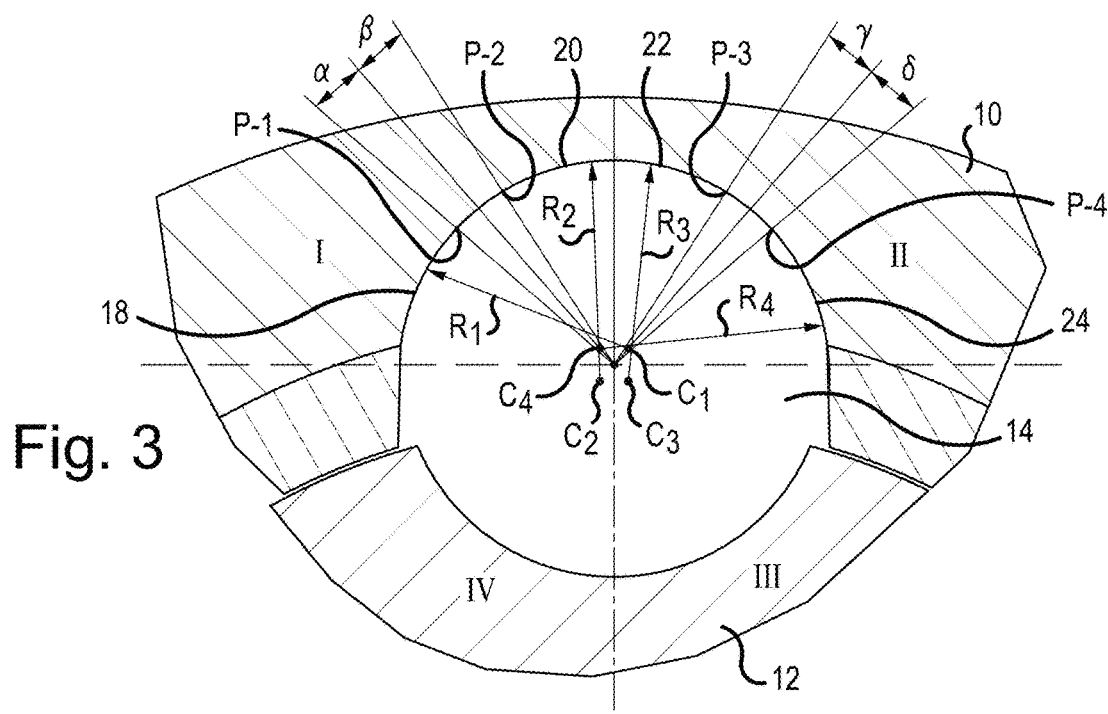
FIG. 3 shows a sectional view of the constant velocity joint of FIG. 1 along the sectional plane Y-Y.
Figure 4:
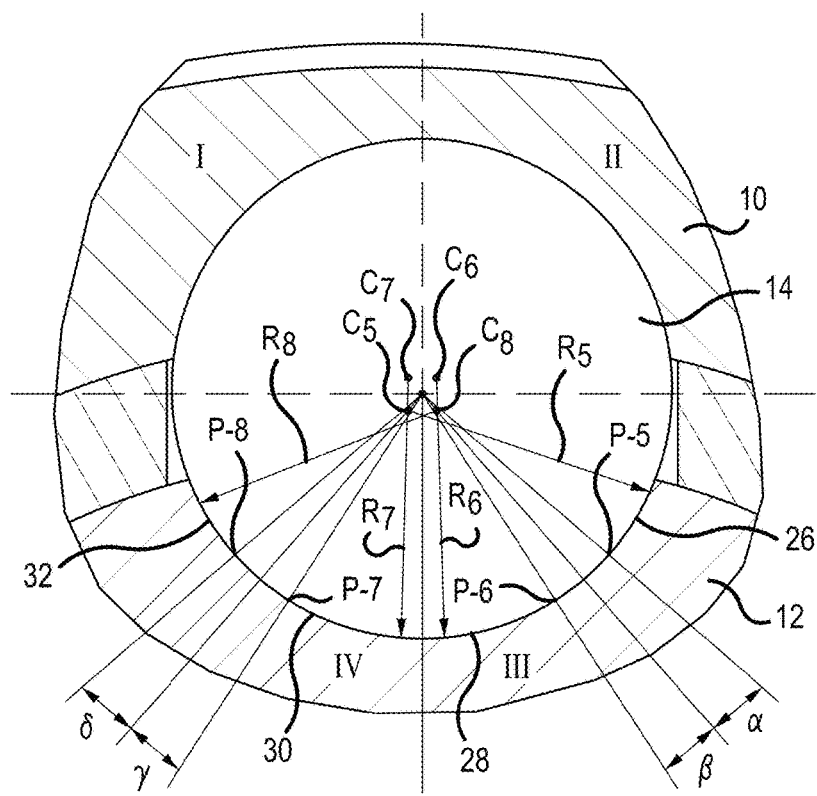
FIG. 4 shows a sectional view of the constant velocity joint of FIG. 1 along the sectional plane Z-Z.

The region that is defined by the outer ball raceway 10 and the inner ball raceway 12 can be conceptually divided into four quadrants I, II, III, IV (see FIGS. 3 and 4). That is, in axial cross-sections with respect to a longitudinal axis (not indicated) through each groove 9 and 11, each outer ball raceway 10 has a first quadrant I and a second quadrant II and each inner ball raceway 12 has a third quadrant III and a fourth quadrant IV, as discussed in detail below.

In FIGS. 3 and 4, four contact points "P" are respectively depicted for both the outer and the inner ball raceway 10, 12. However, depending on the direction of the torque transmission of the constant velocity joint 1, only the contact points P-1, P-2 and P-5, P-6 (first and third quadrant I, III), and/or the contact points P-3, P-4, and P-7, P-8 (second and fourth quadrant II, IV) are active, since the ball 14 is respectively pressed from the joint outer part 2 in the one or the other direction on the diagonally opposing side of the joint inner part 4.

In order to respectively obtain two contact points P for each ball raceway 10, 12, the ball raceways 10, 12 can have different radii of curvature, as is described below.

In the region of the first quadrant I, the outer ball raceway 10 has two different radii of curvature, so that in the region 18 the ball raceway is divided into a region 18 having a first radius of curvature $R_1$ and a region 20 having a second radius of curvature $R_2$. In the second quadrant II, the outer ball raceway also has two different radii of curvature so that in the region of the second quadrant II the outer ball raceway 10 is also divided into a region 22 having a third radius of curvature $R_3$ and a region 24 having a fourth radius of curvature $R_4$.

In a similar manner, the inner ball raceway 12 has different radii of curvature, i.e., two different radii of curvature in the region of the third quadrant III so that the ball raceway 12 is divided into a region 26 having a first radius of curvature $R_5$ and a region 28 having a second radius of curvature $R_6$. In the fourth quadrant IV, the inner ball raceway 12 is divided into a region 30 having a third radius of curvature Ry and a region 32 having a fourth radius of curvature $R_8$.

Here the radii of curvature of the outer ball raceway 10 and the inner ball raceway 12 are configured such that with a torque transmission in a first direction the contact points P-1, P-2, and P-5, P-6 are active, and with a torque transmission in the other direction the contact points P-3, P-4 and P-7, P-8 are active. In each case, the center points $C_1$, $C_2$ of the radii of curvature $R_1$, $R_2$, respectively, of the regions 18, 20 are offset with respect to each other, the center points $C_3$, $C_4$ of the radii of curvature $R_3$, $R_4$, respectively, of the regions 22, 24 are offset with respect to each other, the center points $C_5$, $C_6$ of the radii of curvature $R_5$, $R_6$, respectively, of the regions 26, 28 are offset with respect to each other, and the center points $C_7$, $C_8$ of the radii of curvature $R_7$, $R_8$, respectively, of the regions 30, 32 are offset with respect to each other.

The radii of curvature can also be identical to one another, and the center points of the radii of curvature of the respective adjacent regions in a quadrant I, II, III, IV must only not coincide in order to achieve the specific arrangement of the contact points P-1 to P-8. In particular, due to identical radii of curvature a symmetric distribution of the radii of curvature and their center points on the four quadrants I, II, III, IV can be achieved. Due to this symmetric arrangement, the load is uniformly distributed on the respective four active contact points between the ball 14 and the outer and the inner ball raceways 10, 12. Alternatively, however, an asymmetric distribution of the radii of curvature can be present.

It is also possible that in the outer raceway 10, the center points of the radii of curvature of the regions 20, 22 coincide, and the center points of the radii of curvature of the regions 28, 30 of the inner raceway 12 also coincide. In this case the outer ball raceway 10 overall includes three regions 18 and 20/22 and 24 that have three radii of curvature having three center points, and the inner ball raceway 12 overall can have three regions 26 and 28/30 and 32 that also have three radii of curvature having three center points. Here the three radii of curvature can respectively be identical, or two radii of curvature can be identical and one can be different from them, or all three radii of curvature can be different from one another.

In particular, the radii of curvature are configured such that the contact points P-1 and P-2 lie in an angular range α and β, respectively, about the transition between the regions 18 and 20. The angles α and β can be identical or different and preferably lie in a range of ±10° about the transition between the regions 18 and 20. This applies in the same manner for the contact points P-3 and P-4, which can also lie in an angular range γ, δ, respectively, about the transition between the regions 22 and 24. Here the angles γ, δ can also be identical to each other or different, and preferably lie in a range of ±10°.

This also applies for the inner ball raceway 12, wherein the radii of curvature can be configured such that the contact points P-5 and P-6 lie in an angular range α and β about the transition between the regions 26 and 28. The angles α and β can be identical or different, and preferably lie in a range of ±10° about the transition between the regions 26 and 28. This applies in the same manner for the contact points P-7 and P-8, which can also lie in an angular range γ, δ about the transition between the regions 30 and 32. Here the angles γ, δ can also be identical to each other or different, and preferably lie in a range of ±10°.

Due to the above-described special design of the ball raceways 10, 12, it can be achieved that the ball 14 always has two contact points, P-1 and P-2 or P-3 and P-4, with the outer ball raceway 10, and/or two contact points, P-5 and P-6 or P-7 and P-8, with the inner ball raceway 12. In this way the pressure that is exerted by the ball 14 on the ball raceways 10, 12 can be better distributed on the ball raceways 10, 12. This reduces the pressure on the ball raceways 10, 12 and thus leads to lower wear and a lengthened service life of the constant velocity joint 1.

Due to the constant velocity joint 1 described herein, an improved and reduced wear behavior and thus an increased service life of the constant velocity joint 1 can thus be achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMBER LIST

1 Constant velocity joint
2 Joint outer part
4 Joint inner part
6 Connecting side
8 Opening side
9 Groove
10 Outer ball raceway
11 Groove
12 Inner ball raceway
14 Ball
16 Cage
18 Region having first radius of curvature
20 Region having second radius of curvature
22 Region having third radius of curvature
24 Region having fourth radius of curvature
26 Region having first radius of curvature
28 Region having second radius of curvature
30 Region having third radius of curvature
32 Region having fourth radius of curvature
P Contact points
I, II, III, IV Quadrants
α, β, γ, δ Angles

We claim:

1. A constant velocity joint comprising:
a joint outer part having a connecting portion and an opening portion, the opening portion having a plurality of axially extending grooves, each groove providing an outer ball raceway;
a joint inner part having a plurality of axially extending grooves, each groove of the joint inner part providing an inner ball raceway, each one of the outer ball raceways and a separate one of the inner ball raceways forming one of a plurality of raceway pairs; and
a plurality of balls, each ball being disposed within a separate one of the plurality of raceway pairs;
wherein the outer ball raceway and the inner ball raceway of each raceway pair define a region that, in a cross-section with respect to a longitudinal axis of each groove, is conceptually divided into four quadrants;
wherein the outer ball raceway is disposed in a first quadrant and a second quadrant and the inner ball raceway is disposed in a third quadrant and a fourth quadrant;
wherein with a torque transmission of the constant velocity joint in a first direction, each ball has two simultaneous contact points in the first quadrant and/or two simultaneous contact points in the third quadrant; and/or wherein with a torque transmission of the constant velocity joint in a second direction, each ball has two simultaneous contact points in the second quadrant and/or two simultaneous contact points in the fourth quadrant.

2. The constant velocity joint according to claim 1, wherein at least one of:
the outer ball raceway has a first radius of curvature and a second radius of curvature in the first quadrant, each one of the first radius of curvature and the second radius of curvature having a separate center point, the center point of the first radius and the center point of the second radius being offset with respect to each other; and
the outer ball raceway has a third radius of curvature and a fourth radius of curvature in the second quadrant, each one of the third radius of curvature and the fourth radius of curvature having a separate center point, the center point of the third radius and the center point of the fourth radius being offset with respect to each other.

3. The constant velocity joint according to claim 2, wherein:
the first radius of curvature and the second radius of curvature are each configured such that one of the two contact points in the first quadrant lies in a region of the first radius of curvature and the other of the two contact points in the first quadrant lies in a region of the second radius of curvature; and/or
the third radius of curvature and the fourth radius of curvature are each configured such that one of the two contact points in the second quadrant lies in the region of the third radius of curvature and the other of the two contact points in the second quadrant lies in the region of the fourth radius of curvature.

4. The constant velocity joint according to claim 2, wherein:
the two contact points in the first quadrant of the outer ball raceway are disposed in a range of ±10° about a transition between the first radius of curvature and the second radius of curvature; and/or
the two contact points in the second quadrant of the outer ball raceway are disposed in a range of ±10° about a transition between the third radius of curvature and the fourth radius of curvature.

5. The constant velocity joint according to claim 2, wherein:
the first quadrant of the outer ball raceway is divided by the first radius of curvature and the second radius of curvature into two identical parts; and/or
the second quadrant of the outer ball raceway is divided by the third radius of curvature and the fourth radius of curvature into two identical parts.

6. The constant velocity joint according to claim 1, wherein at least one of:
the inner ball raceway has a first radius of curvature and a second radius of curvature in the third quadrant, each one of the first radius of curvature and the second radius of curvature having a separate center point, the center point of the first radius and the center point of the second radius being offset with respect to each other; and
the inner ball raceway has a third radius of curvature and a fourth radius of curvature in the fourth quadrant, each one of the third radius of curvature and the fourth radius of curvature having a separate center point, the center point of the third radius and the center point of the fourth radius being offset with respect to each other.

7. The constant velocity joint according to claim 6, wherein:
- the first radius of curvature and the second radius of curvature are each configured such that one of the two contact points in the third quadrant lies in a region of the first radius of curvature and the other of the two contact points in the third quadrant lies in a region of the second radius of curvature; and/or
- the third radius of curvature and the fourth radius of curvature are each configured such that one of the two contact points in the fourth quadrant lies in the region of the third radius of curvature and the other of the two contact points in the fourth quadrant lies in the region of the fourth radius of curvature.

8. The constant velocity joint according to claim 6, wherein:
- the two contact points in the third quadrant of the inner ball raceway are disposed in a range of ±10° about a transition between the first radius of curvature and the second radius of curvature; and/or
- the two contact points in the fourth quadrant of the inner ball raceway are disposed in a range of ±10° about a transition between the third radius of curvature and the fourth radius of curvature.

9. The constant velocity joint according to claim 6, wherein:
- the third quadrant of the inner ball raceway is divided by the first radius of curvature and the second radius of curvature into two identical parts; and/or
- the fourth quadrant of the inner ball raceway is divided by the third radius of curvature and the fourth radius of curvature into two identical parts.

* * * * *